Sept. 28, 1954

G. H. CALVERT 2,690,491

THERAPEUTIC HEATER UNIT

Filed May 1, 1953

INVENTOR.
GRESHAM H CALVERT
BY
ATTORNEYS

Patented Sept. 28, 1954

2,690,491

UNITED STATES PATENT OFFICE 2,690,491

THERAPEUTIC HEATER UNIT

Gresham H. Calvert, Santa Cruz, Calif.

Application May 1, 1953, Serial No. 352,465

4 Claims. (Cl. 201—67)

This invention relates to and in general has for its object the provision of an infrared or black body radiating heating element for therapeutic heaters and which constitutes an improvement in and to the heating element described and claimed in my Patent No. 2,596,837 of May 13, 1952.

The heating element as disclosed in said patent comprises a glass tube interiorly coated with and bonded to a body of granular material such as crystalline silica or silicon carbide, said material being indirectly heated by a coaxial heating element confined within the tube and positively spaced therefrom.

More specifically the object of this invention is the provision of a heating element of the character above described but wherein the granular material instead of being bonded to the interior surface of the glass tube is merely loosely confined within an annular chamber formed by two coaxial glass tubes and wherein the axial resistance element is coated with aluminum oxide. By resorting to these two expedients, the granules being loose are free to vibrate at their own periods, free of any damping action such as would result if they were bonded to the tubing. Although many other materials have been tried for this purpose, no other material has been found which is nearly as effective as aluminum oxide.

The invention possesses other advantageous features, some of which, with the foregoing, will be set forth at length in the following description where that form of the invention which has been selected for illustration in the drawings accompanying and forming a part of the present specification, is outlined in full. In said drawings, one form of the invention is shown, but it is to be understood that it is not limited to such form, since the invention as set forth in the claims may be embodied in other forms.

Referring to the drawings.

Figure 1:
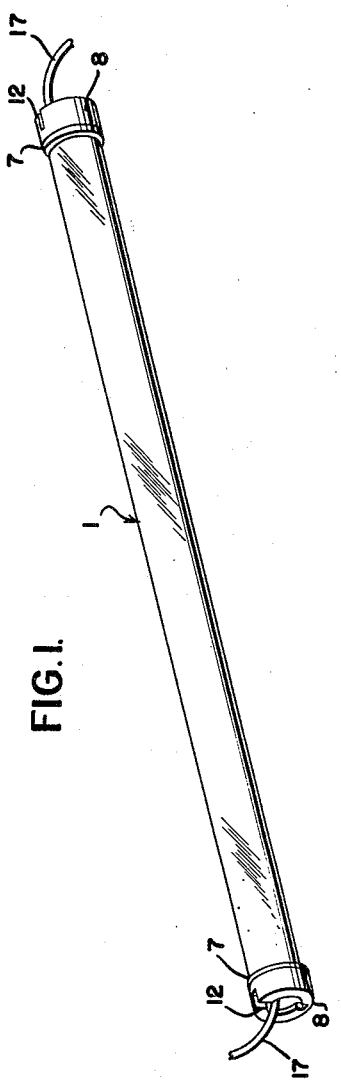
Fig. 1 is a perspective view of a heating element embodying the objects of my invention.

As illustrated in these various figures, the objects of my invention have been embodied in a heating element comprising an outer section of glass tubing 1 and an inner coaxial section of glass tubing 2 together defining an intermediate annular chamber 3 filled with an annular body of an inorganic granular material 4, such as silica carbide, galena, pitch blend, powdered garnet and powdered topaz and other industrial gems and/or crystals, preferably ground to from 40 to 250 mesh.

Disposed between the ends of tubing sections 1 and 2 is an asbestos spacing ring 5. Fitted within the end of the outer tubing section 1 is an annular asbestos gasket 6 provided at its outer end with an outwardly extending flange 7 overhanging the end of the outer tubing section 1. Closing the outer open end of the gasket 6 and extending thereinto is a porcelain plug or cap 8 provided with a flange 9 overlaying the gasket flange 7 and formed at its outer end with a terminal recess 11 and with radially aligned screw driver kerfs 12. Since both ends of the heating element or unit are identical, this description of course applied equally to both of said ends. Inserted coaxially of the plug 8 is a screw 13 threaded into a nut 14 countersunk in the inner end of the plug.

Figure 2:
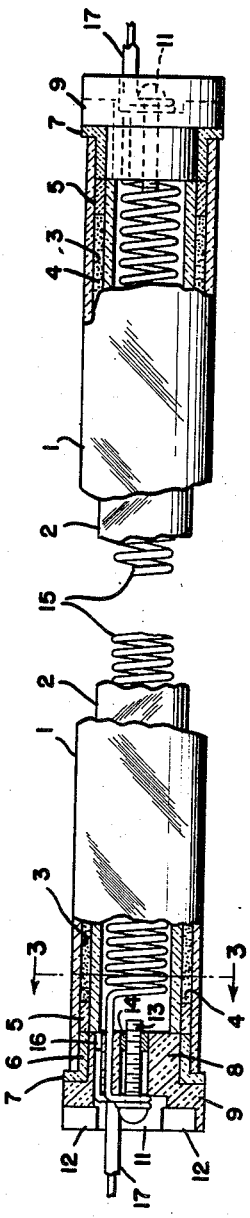
Fig. 2 is a side view of the heating element illustrated in Fig. 1 with portions thereof broken away to better illustrate its construction.
Figure 3:
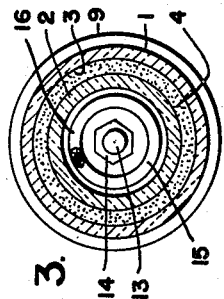
Fig. 3 is a transverse section of the device taken on the section line 3—3 of Fig. 2.
Figure 4:
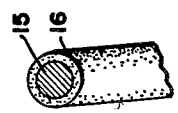
Fig. 4 is an enlarged fragmentary section of the aluminum oxide coated resistance element of the unit.

Coaxially suspended within the inner tube section 2 and positively spaced therefrom is a coiled Nichrome wire resistance element 15 coated with a layer 16 of aluminum oxide and connected at each of its ends to one of the screws 11. As best shown in the left-hand end of Fig. 2, each of the free ends of the element 15 is sheathed in a small hole 16 formed longitudinally in each cap 8. Also as shown in this figure, the screws 11 serve as connectors for connecting the unit through leads 17 with a conventional plug or source of 110 volt A. C. house current.

Although not shown, the unit above described is designed to be mounted within a reflector supported by a table type or floor type pedestal.

From the above description it will be seen that I have provided a heating unit of the character disclosed in my aforementioned patent but which constitutes an improvement therein in that the granular material is loosely disposed within the unit rather than being formed into a rigid structure and in that the resistance unit is coated with aluminum oxide. As a consequence of these changes, the character of heat produced and the efficiency of the unit has been materially increased.

Having thus described my invention, what I claim and desire to secure by Letters Patent is:

1. A heating element comprising: coaxial inner and outer glass tubes defining an intermediate annular chamber, insulating plugs supporting and closing the ends of said tubes; a body of inorganic granular material disposed within said annular chamber; a resistance element disposed within said inner tube coaxially therewith, said resistance element being coated with aluminum oxide.

2. A heating element such as defined in claim 1 wherein said resistance element is in the form of a spiral of wire.

3. A heating element such as defined in claim 1 wherein said resistance element is positively spaced from said inner tube.

4. A heating element such as defined in claim 1 wherein said granular material consists of silica carbide.

No references cited.